No. 860,082. PATENTED JULY 16, 1907.
G. CORNILLEAU.
POWER TRANSMISSION MECHANISM.
APPLICATION FILED APR. 20, 1906.

Witnesses: Inventor:
Gustave Cornilleau,
By Wm. E. Poulter
Attorney

UNITED STATES PATENT OFFICE.

GUSTAVE CORNILLEAU, OF PARIS, FRANCE.

POWER-TRANSMISSION MECHANISM.

No. 860,082.     Specification of Letters Patent.     Patented July 16, 1907.

Application filed April 20, 1906. Serial No. 312,781.

*To all whom it may concern:*

Be it known that I, GUSTAVE CORNILLEAU, a citizen of the Republic of France, residing at Paris, in France, have invented a certain new and useful Power-Transmission Mechanism, of which the following is a specification.

This invention relates to power transmission mechanism particularly applicable for change speed gear for motorcars, the mechanism acting in a reliable manner whether the car is traveling on the level or going up or down hill.

Figure 1:
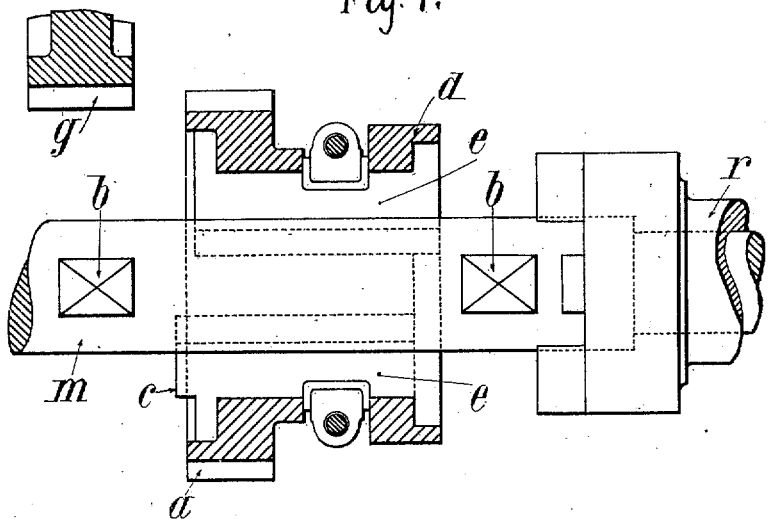
Figure 2:
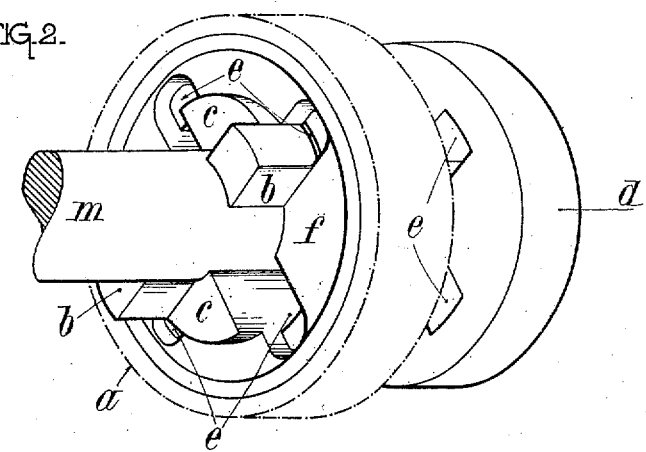
Figure 3:
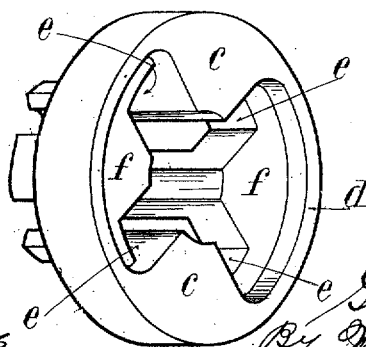

In the accompanying drawing:—Figure 1 is a longitudinal section showing the application of the mechanism to one of the loose toothed wheels of a change speed gear. Fig. 2 shows in perspective the said toothed wheel at the moment of changing from one speed to another. Fig. 3 shows a modified construction of the said gear.

In mechanisms which comprise longitudinally adjustable toothed wheels which can be secured when desired to their spindles by means of keys, it frequently happens that the slots made in the toothed wheels for receiving the keys do not come always exactly opposite the latter, which are thus unable to drive the toothed wheels. This results in shocks, due to the meeting of sharp edges, so that it is impossible to operate with all the desired reliability, the controlling lever, to which the said shocks are transmitted.

In order to avoid the above drawbacks, the toothed wheel $a$ which it is desired to bring into engagement with the key $b$ on the driving shaft $m$, is provided, according to this invention, with four recesses or slots $e$ arranged in the shape of a cross, instead of having only two arranged diametrically opposite each other. Two oppositely disposed projections are formed between the adjacent edges of the corresponding recesses the sides of the projections and the sides of the recesses between which they are situated being in one and the same plane. In other words the height or depth of the diametrically opposite sides of the slots, or slots and projections are the same. Between these projections, of which there are two for the four recesses or openings $e$, are sectors or faces $f$ in a different plane and of greater width than the width of a recess $e$, so that the key $b$, arranged on the shaft $m$ (which is of the same width as the recesses) can easily pass between the projections $c$ and strike the face of one or other of them.

When the driving shaft $m$ is rotating and the wheel $a$ is moved so as to bring it into engagement with the key $b$, the latter first strikes, with its diagonally opposite faces, the corresponding faces of the two projections $c$, whereupon the wheel $a$ is brought into rotation before coming into engagement with an intermediate toothed wheel $g$. By operating the gear so as to move the wheel $a$ further towards the key $b$, the recesses $e$ will slide with their faces in contact with the sides of the key $b$, so that their complete engagement with the latter can take place without difficulty. The driving of the wheel $a$ by the spindle $m$ and of the spindle $m$ by the key $b$, can therefore take place in either direction of rotation of either of the two movable parts.

The special arrangement of the recesses $e$ in the shape of a cross, enables therefore the speed to be changed during the climbing of a hill by the car, as well as during the descent or while driving on a level. In fact, let us assume that the said change is to be effected during a descent and that the brake has been applied to the engine in order to reduce the speed of the car. In that case, the wheel $a$ is no longer driven by the engine, but only by the momentum of the car, and the driving shaft offers resistance, so that when the wheel or disk $a$ is moved so as to bring it into engagement with the key $b$, the latter will engage with the projections $c$ in front of the two recesses $e$ arranged at an angle of 90° relatively to those previously considered, which will enable the complete engagement of the toothed wheel to take place with the key $b$.

The space between two keys $b$ on the shaft $m$ on either side of the gear wheel is such that the disengaged position corresponds to the position of the toothed wheels when they are mid-way between the said keys and free from them, and therefore in a state of rest or non-use.

The projections $c$, instead of being of the construction shown in Fig. 2, could be as shown in Fig. 3, that is to say, they could be produced by recesses $f$ cut in the material of the toothed wheel or of a disk $d$ secured to the said wheel and capable of being utilized as a direct transmission disk between the driving shaft $m$ and the driven shaft $r$.

What I claim as my invention and desire to secure by Letters Patent is:—

In a power transmission device of the kind described the combination with a rotating shaft having two projections thereon, of two disks mounted on the shaft between the projections so as to be movable longitudinally on said shaft, each disk having four slots arranged in the form of a cross and each slot of a width to receive a shaft projection therein, and two oppositely-disposed projections on the disk filling the space between the adjacent edges of the two adjacent slots substantially as set forth.

In testimony whereof I have signed my name to this specification in the presence of two subscribing witnesses.

GUSTAVE CORNILLEAU.

Two witnesses:
   HANSON C. COXE,
   GEORGES BONNEUIL.